M. J. OWENS.
MAKING SHEET GLASS.
APPLICATION FILED JAN. 6, 1919.
1,345,628.
Patented July 6, 1920.
2 SHEETS—SHEET 1.
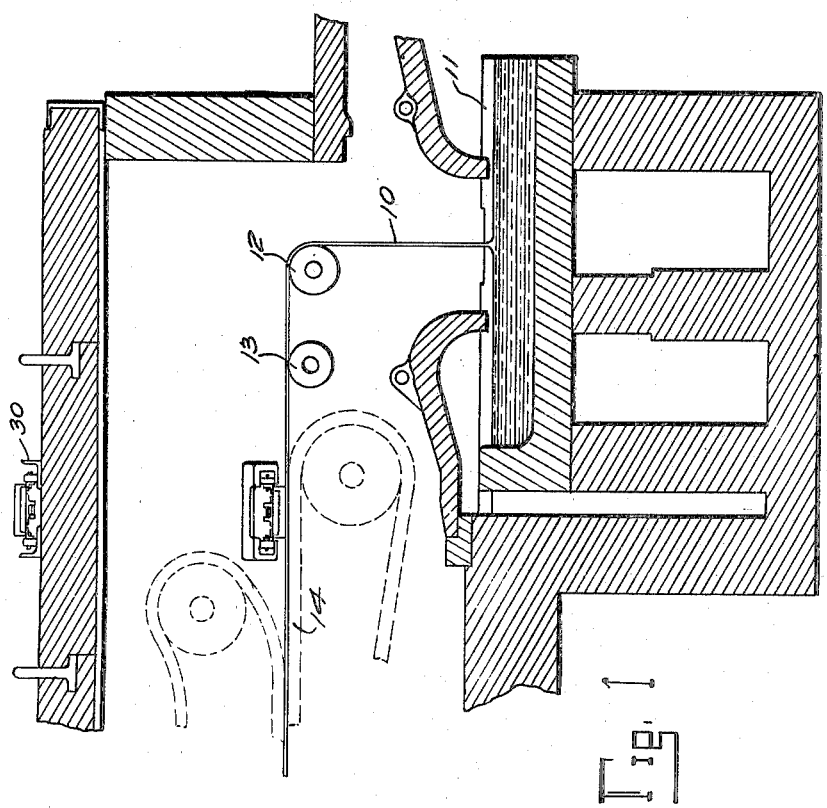
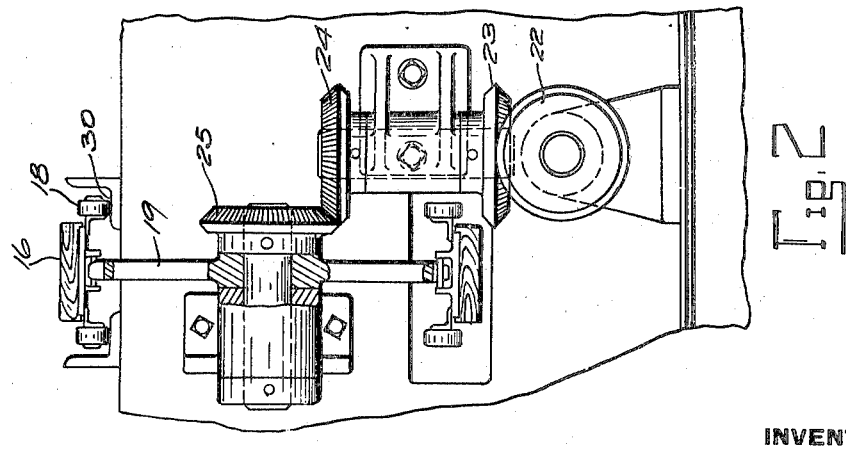
INVENTOR
Michael J. Owens.
By J. F. Rule
His attorney.

M. J. OWENS.
MAKING SHEET GLASS.
APPLICATION FILED JAN. 6, 1919.
1,345,628.
Patented July 6, 1920.
2 SHEETS—SHEET 2.
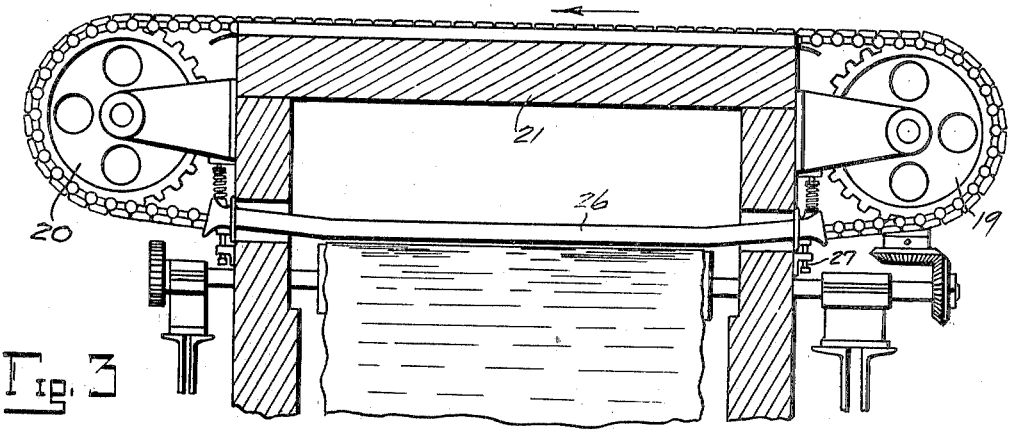
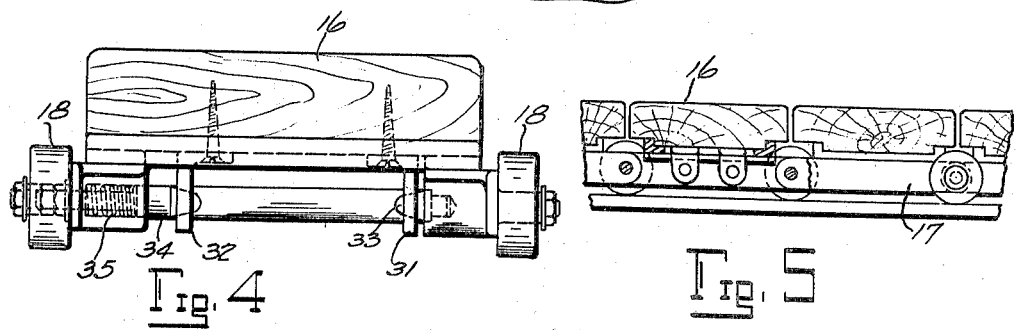
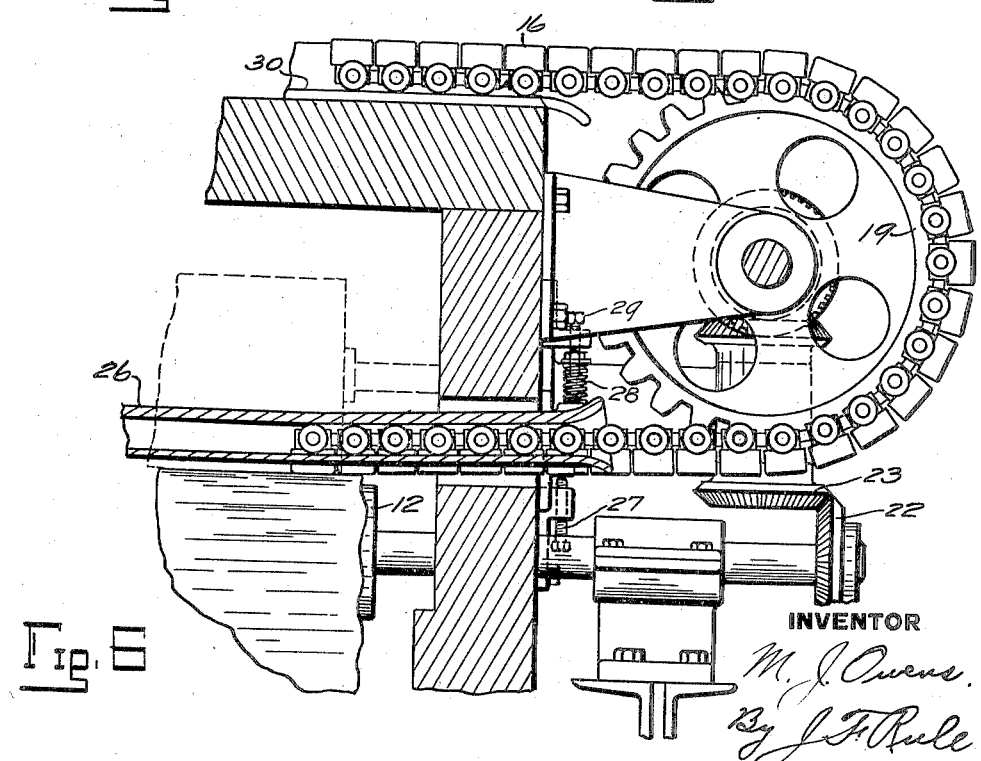
INVENTOR

UNITED STATES PATENT OFFICE.

MICHAEL J. OWENS, OF TOLEDO, OHIO, ASSIGNOR TO THE LIBBEY-OWENS SHEET GLASS COMPANY, OF TOLEDO, OHIO, A CORPORATION OF OHIO.

MAKING SHEET-GLASS.

1,345,628.        Specification of Letters Patent.        Patented July 6, 1920.

Application filed January 6, 1919. Serial No. 269,746.

*To all whom it may concern:*

Be it known that I, MICHAEL J. OWENS, a citizen of the United States, and resident of Toledo, in the county of Lucas and State of Ohio, have invented certain new and useful Improvements in Making Sheet-Glass, of which the following is a specification.

My invention relates to making sheet glass, and is particularly adapted to the method which consists in drawing the glass continuously in a sheet which, if the sheet is drawn vertically, may be passed over a bending roll, by which the glass is deflected to a horizontal direction, and conveyed through the leer. In making glass by this method it has been customary to reheat the glass after it was drawn from the pool in order to make it sufficiently soft and plastic to draw in a smooth flat sheet. The glass at such temperature takes the impress of the bending roll or other supporting surface over which it passes. It also takes an impression from the drawing table or conveyer over which it passes, said table usually being formed of a series of blocks or sections spaced so that the unsupported portions of the sheet will settle slightly between the supported portions, with the result that the surface of the finished sheet is not perfectly smooth. If the glass as it is drawn is permitted to cool sufficiently to prevent it from taking an impression from the bending roll and the drawing table, it will not be perfectly flat, but is more or less wavy.

An object of my invention is to overcome the above difficulties and produce a high grade glass with a smooth unmarked surface. In carrying out the invention, the sheet of glass is passed over the bending roll or other supporting surface at a temperature which will prevent said surface from making any impress in the glass or marring the natural glaze that forms on the glass as it is drawn. The surface of the glass after it passes beyond the bending roll is flattened or ironed out by a flattening device which preferably consists of an endless chain of blocks traveling continuously across the surface of the glass.

Another object of the invention is to save fuel by obviating the need of the burners heretofore used for reheating the glass after it is drawn from the pool.

Other features and advantages of the invention will appear hereinafter.

In the accompanying drawings, Figure 1 is a sectional elevation of an apparatus embodying the principles of my invention.

Fig. 2 is a detail showing gearing for driving the flattening device.

Fig. 3 is a transverse sectional elevation.

Fig. 4 is a detail view of one of the flattening blocks.

Fig. 5 is a fragmentary view of the chain of blocks.

Fig. 6 is a view on a larger scale of a portion of the mechanism shown in Fig. 3.

The glass is drawn upward continuously in the form of a sheet 10 from the receptacle 11 which may be a boot or extension of a continuous melting furnace. The sheet passes over a metal bending roll 12 and thence rearwardly over a supporting roll or rolls 13 and to the endless drawing table 14 which may be of any approved construction. As the glass moves upward from the pool its temperature is reduced sufficiently to cause a glaze to form on the surface, which prevents it from being marred by the roll 12 or taking any impression from said roll. The glass is not reheated after it is drawn from the pool as has heretofore been customary, but a sufficient amount of the heat within the glass is retained to keep the glass at the required temperature.

A flattening device by which all waviness or unevenness is ironed out of the sheet, comprises an endless chain of flattening blocks 16. These blocks are mounted on links or brackets 17 carrying rolls 18. The chain runs over sprocket wheels 19 and 20, mounted on opposite sides of the leer or chamber 21. The lower lead of the chain of blocks extends across the sheet with the blocks bearing against the upper surface of the glass. The chain of blocks is driven from the bending roll through a train of gears comprising a miter gear 22 on the bending roll shaft, miter gears 23 and 24 on a vertical shaft, the gear 24 meshing with a gear 25 connected to rotate with the sprocket wheel 19. The blocks are thus moved continuously across the surface of the glass as the latter advances, so that all unevenness of the sheet is "ironed" out. The sheet has been reduced to its final thickness before it reaches the flattening device, the action of the latter being to flatten the sheet down against tht supporting surface therebeneath wherever the glass is out of contact with such surface. The blocks are made of wood or other material which will slide over the surface of the glass without marring it. If desired, any suitable means may be provided for keeping the blocks damp or for running them through a bath of cooling liquid.

The weight of the chain of blocks may be sufficient in some instances to provide the required pressure of the blocks against the glass, but the said blocks are preferably guided through a channel bar or frame 26 extending across the sheet of glass. This channel bar forms a track for the rolls 18. The bar 26 is adjustably supported at its ends on adjusting screws 27 permitting it to be nicely adjusted with respect to the glass. Said bar serves to hold the blocks in alinement and insures their positive and uniform action on the glass. It is also a convenient means for providing the necessary weight or pressure of the blocks on the glass. This pressure may be increased and adjusted by springs 28, the tension of which is regulated by adjusting screws 29. The upper lead of the chain runs on a track comprising angle bars 30 extending across the top of the furnace 21. The blocks are made of wood or other suitable material and are preferably removably mounted so that any block may be quickly removed and replaced by a new block while the chain is running. For this purpose the blocks are provided with angle irons 31 and 32 (Fig. 4) having openings to receive the bearing studs 33 and 34. The stud 34 is held in position by a spring 35 and may be quickly withdrawn in the direction of its length, permitting the block 16 to be lifted off the stud 33.

Modifications may be resorted to without departing from the spirit and scope of my invention.

What I claim is:

1. The combination with means for drawing a sheet of glass, of a bending roll over which the glass is drawn, and a flattening device moving transversely over the surface of the glass after it passes beyond the bending roll.

2. The combination with means for continuously drawing a sheet of glass, of a flattening device, means for moving said device continuously in one direction over the surface of the glass in contact therewith transversely to the direction in which the glass is drawn, and means for supporting the surface of the glass opposite the flattening device.

3. The combination with means for continuously drawing a sheet of glass from a supply of molten glass, of a bending roll over which the sheet is drawn and by which its direction is changed, and an endless chain of flattening blocks running in sliding contact with the surface of the glass beyond said roll.

4. The combination with means to continuously draw a sheet of glass from a pool of molten glass, of a support over which the sheet is drawn, said sheet being free from surface contact until it reaches said support, means to envelop the glass during its passage to said support in an atmosphere at such temperature that the glass is cooled during its passage to said support sufficiently to form a surface glaze that will not be marred by said support, and a flattening device operating on the surface of the glass to remove waves or unevenness in the sheet.

5. The combination with means to continuously draw a sheet of glass from a pool of molten glass, of a support over which the sheet is drawn, said sheet being free from surface contact until it reaches the support and permitted to cool during its passage to said support and thereby form a surface glaze that will not be marred by said support, a flattening device, and means to slide said device over the surface of the glass at a point beyond said support.

6. The combination with means for drawing a sheet of glass from a pool of molten glass, of a bending roll over which the glass is drawn, means to keep the glass in a cooling atmosphere as it advances from the pool to the bending roll and cause a surface glaze to form thereon which will not be marred by the roll, and a flattening device in sliding contact with the glass beyond said roll.

7. The method which consists in continuously drawing a sheet of glass from a pool of molten glass over a support, cooling the sheet before it reaches said support and thereby causing a surface glaze to form thereon which will not be marred by its contact with said support, and sliding a flattening device over the surface beyond said support, thereby flattening the sheet.

8. The method which consists in continuously drawing a sheet of glass from a pool of molten glass over a support, enveloping the sheet in a cooling atmosphere throughout its passage to said support and thereby cooling the sheet before it reaches said support sufficiently to cause a surface glaze to form thereon which will not be marred by its contact with said support, and continuously sliding a wooden flattening device over said glazed surface after it has reached said support.

9. The combination with a bending roll, of means for continuously drawing a sheet of glass over said roll from a pool of molten glass, said drawing means comprising a drawing table, a flattening device over said table, and means to slide it on the upper surface of the glass.

10. The combination with a bending roll, of means for continuously drawing a sheet of glass over said roll from a pool of molten glass, said drawing means comprising a table over which the sheet is drawn, a flattening device over the drawing table, and means to slide said device over the surface of the sheet transversely thereof.

11. The combination with a bending roll, of means for continuously drawing a sheet of glass over said roll from a pool of molten glass, said drawing means comprising a drawing table, a flattening device over said table comprising an endless chain of wood blocks, and means to drive said chain and cause the blocks to slide on the surface of the glass transversely of the sheet.

12. The combination with a bending roll, of means for continuously drawing a sheet of glass over said roll from a pool of molten glass, said drawing means comprising a drawing table, a flattening device over said table comprising an endless chain of blocks, means to drive said chain and cause the blocks to slide on the surface of the glass transversely of the sheet, a channel bar extending across the sheet and forming a guideway for the blocks as they slide across the glass, and means to adjust said bar toward and from the glass.

13. The combination with a bending roll, of means for continuously drawing a sheet of glass over said roll from a pool of molten glass, said drawing means comprising a drawing table, a flattening device over said table comprising an endless chain of blocks, means to drive said chain and cause the blocks to slide on the surface of the glass transversely of the sheet, and means to adjust the pressure of the blocks on the glass.

14. The combination with a bending roll, of means for continuously drawing a sheet of glass over said roll from a pool of molten glass, said drawing means comprising a drawing table, a flattening device over said table, comprising an endless chain of blocks, means to drive said chain and cause the blocks to slide on the surface of the glass transversely of the sheet, a channel bar extending across the sheet and forming a guideway for the blocks as they slide across the glass, springs arranged to apply pressure to said bar and thereby cause pressure of the blocks against the glass, and means to adjust the pressure of said springs.

Signed at Toledo, in the county of Lucas and State of Ohio, this 31st day of December, A. D. 1918.

MICHAEL J. OWENS.